(12) United States Patent
Li

(10) Patent No.: US 12,388,952 B2
(45) Date of Patent: Aug. 12, 2025

(54) VIDEO FRAME INSERTION METHOD AND APPARATUS, AND ELECTRONIC DEVICE

(71) Applicant: VIVO MOBILE COMMUNICATION CO., LTD., Guangdong (CN)

(72) Inventor: Yayu Li, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 47 days.

(21) Appl. No.: 18/355,358

(22) Filed: Jul. 19, 2023

(65) Prior Publication Data

US 2023/0362328 A1 Nov. 9, 2023

Related U.S. Application Data

(63) Continuation of application No. PCT/CN2022/073205, filed on Jan. 21, 2022.

(30) Foreign Application Priority Data

Jan. 28, 2021 (CN) .......................... 202110121129.8

(51) Int. Cl.
*H04N 7/01* (2006.01)
*G06T 3/40* (2024.01)
(Continued)

(52) U.S. Cl.
CPC ............. *H04N 7/0127* (2013.01); *G06T 3/40* (2013.01); *G06T 5/50* (2013.01); *G06T 5/70* (2024.01);
(Continued)

(58) Field of Classification Search
None
See application file for complete search history.

(56) References Cited

U.S. PATENT DOCUMENTS 9,473,758 B1 * 10/2016 Long .................... H04N 13/275
10,200,608 B1 * 2/2019 Leizerovich, Jr. ... H04N 23/698
(Continued)

FOREIGN PATENT DOCUMENTS

CN 102378010 A 3/2012
CN 103379351 A 10/2013
(Continued)

OTHER PUBLICATIONS

First Office Action for Chinese Application No. 202110121129.8, dated Dec. 8, 2022, 8 Pages.
(Continued)

*Primary Examiner* — Hung Q Dang
(74) *Attorney, Agent, or Firm* — BROOKS KUSHMAN P.C.

(57) ABSTRACT

A video frame insertion method and apparatus and an electronic device. The method includes: in a case that resolution of a first video is greater than preset resolution, processing each video frame of the first video according to a target rule to obtain a second video, where resolution of the second video is less than or equal to the preset resolution; performing frame insertion processing on the second video to obtain a third video; and generating a fourth video according to the target rule and the third video, where resolution of the fourth video is equal to the resolution of the first video, and a quantity of frames in the fourth video is the same as a quantity of frames in the third video.

7 Claims, 7 Drawing Sheets

(51) Int. Cl.
  *G06T 5/50*      (2006.01)
  *G06T 5/70*      (2024.01)
  *H04N 21/4402*   (2011.01)

(52) U.S. Cl.
  CPC .............. *G06T 2207/10016* (2013.01); *G06T 2207/20021* (2013.01); *G06T 2207/20212* (2013.01)

(56) References Cited

U.S. PATENT DOCUMENTS

| | | | |
|---|---|---|---|
| 2003/0185302 A1* | 10/2003 | Abrams, Jr. | ......... H04N 23/661 |
| | | | 386/E5.072 |
| 2005/0024391 A1 | 2/2005 | Damera-Venkata | |
| 2006/0050785 A1 | 3/2006 | Watanabe et al. | |
| 2009/0016623 A1 | 1/2009 | Higewake | |
| 2009/0079760 A1 | 3/2009 | Tu et al. | |
| 2010/0027664 A1 | 2/2010 | Sato | |
| 2014/0098886 A1 | 4/2014 | Crenshaw et al. | |
| 2017/0148222 A1 | 5/2017 | Holzer et al. | |
| 2018/0013978 A1 | 1/2018 | Duan et al. | |
| 2018/0063551 A1 | 3/2018 | Adsumilli et al. | |
| 2023/0316456 A1* | 10/2023 | Chen | .................... G06T 3/4007 |
| | | | 382/156 |

FOREIGN PATENT DOCUMENTS

| | | | |
|---|---|---|---|
| CN | 103597839 | A | 2/2014 |
| CN | 107277462 | A | 10/2017 |
| CN | 108063976 | A | 5/2018 |
| CN | 110322424 | A | 10/2019 |
| CN | 110933315 | A | 3/2020 |
| CN | 111372087 | A | 7/2020 |
| CN | 111405316 | A | 7/2020 |
| CN | 112055249 | A | 12/2020 |
| CN | 113015007 | A | 6/2021 |
| JP | 2013120204 | | 6/2013 |

OTHER PUBLICATIONS

IEEE international Symposium on Multimedia "Adaptive Video Compression for Video Surveillance Applications" Media Integration and Communication Center University of Florence, Italy, 2011, 8 Pages.

Dissertation for the Master Degree in Engineering "Video Interlopation Technology Based on Deep Learning" Gu Donghao, Classified Index: TP391, 2020, 72 Pages.

International Search Report and Written Opinion for Application No. PCT /CN2022/073205, dated Apr. 26, 2022, 8 Pages.

Extended European Search Report for Application No. 22745155.6, Jun. 27, 2024, 9 Pages.

* cited by examiner

VIDEO FRAME INSERTION METHOD AND APPARATUS, AND ELECTRONIC DEVICE

CROSS-REFERENCE TO RELATED APPLICATIONS

This application is a continuation of PCT International Application No. PCT/CN2022/073205 filed on Jan. 21, 2022, which claims priority to Chinese Patent Application No. 202110121129.8 filed on Jan. 28, 2021, which are incorporated herein by reference in their entireties.

TECHNICAL FIELD

This application pertains to the field of communication technologies, and in particular, to a video frame insertion method and apparatus, and an electronic device.

BACKGROUND

Generally, one or more intermediate frames may be inserted between adjacent video frames by a frame insertion technology to convert a video from a low frame rate to a high frame rate, thereby making a video image smoother to be viewed, to improve a visual effect of the video image.

Currently, a chip platform merchant provides a hardware-based video frame insertion algorithm, but considering various factors such as hardware power consumption and hardware performance, the video frame insertion algorithm may not support a high-resolution video. Therefore, how to insert a frame into the high-resolution video becomes an urgent technical problem to be resolved.

SUMMARY

According to a first aspect, an embodiment of this application provides a video frame insertion method. The method includes: in a case that resolution of a first video is greater than preset resolution, processing each video frame of the first video according to a target rule to obtain a second video, where resolution of the second video is less than or equal to the preset resolution; performing frame insertion processing on the second video to obtain a third video; and generating a fourth video according to the target rule and the third video, where resolution of the fourth video is equal to the resolution of the first video, and a quantity of frames in the fourth video is the same as a quantity of frames in the third video.

According to a second aspect, an embodiment of this application provides a video frame insertion apparatus. The video frame insertion apparatus includes a determining module and a processing module. The processing module is configured to: in a case that the determining module determines that resolution of a first video is greater than preset resolution, process each video frame of the first video according to a target rule to obtain a second video, where resolution of the second video is less than or equal to the preset resolution; perform frame insertion processing on the second video to obtain a third video; and generate a fourth video according to the target rule and the third video, where resolution of the fourth video is equal to the resolution of the first video, and a quantity of frames in the fourth video is the same as a quantity of frames in the third video.

According to a third aspect, an embodiment of this application provides an electronic device. The electronic device includes a processor, a memory, and a program or an instruction that is stored in the memory and that can run on the processor. When the program or the instruction is executed by the processor, the steps of the video frame insertion method in the first aspect are implemented.

According to a fourth aspect, an embodiment of this application provides a readable storage medium. The readable storage medium stores a program or an instruction, and when the program or the instruction is executed by a processor, the steps of the video frame insertion method in the first aspect are implemented.

According to a fifth aspect, an embodiment of this application provides a chip. The chip includes a processor and a communication interface, the communication interface is coupled to the processor, and the processor is configured to run a program or an instruction to implement the video frame insertion method in the first aspect.

DETAILED DESCRIPTION

Figure 1:
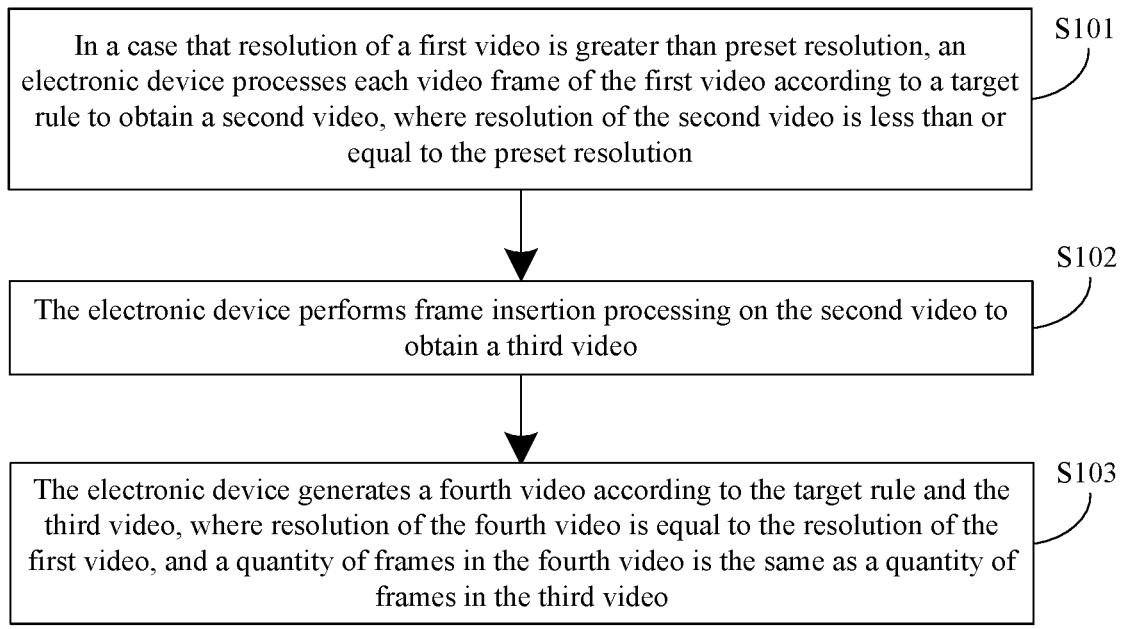
FIG. 1 is a first schematic diagram of a video frame insertion method according to an embodiment of this application.

The following clearly describes the technical solutions in the embodiments of this application with reference to the accompanying drawings in the embodiments of this application. Apparently, the described embodiments are some rather than all of the embodiments of this application. Based on the embodiments of this application, all other embodiments obtained by a person of ordinary skill in the art without creative efforts fall within the protection scope of this application.

The terms "first", "second", and the like in the description and the claims of this application are used to distinguish between similar objects, and do not need to be used to describe a specific order or sequence. It should be understood that, data used in such a way are interchangeable in proper circumstances, so that the embodiments of this application can be implemented in an order other than the order illustrated or described herein. Objects classified by "first", "second", and the like are usually of a same type, and the number of objects is not limited. For example, there may be one or more first objects. In addition, in the specification and the claims, "and/or" represents at least one of connected objects, and a character "/" generally represents an "or" relationship between associated objects.

Currently, two video frame insertion algorithms are provided in the prior art.

One is that a chip platform merchant provides a hardware-based video frame insertion algorithm, but considering various factors such as hardware power consumption and hardware performance, the video frame insertion algorithm may not support a high-resolution video.

The other is that a video platform merchant provides a software-based video frame insertion algorithm, but to adapt to more chip platforms, the video frame insertion algorithm may be designed according to a chip platform with lower performance, and consequently hardware resources cannot be properly used, and a video frame insertion effect is poor.

Assuming that the video frame insertion algorithm provided by the chip platform merchant or the video platform merchant is limited to preset resolution, when a first video into which a user wants to insert a frame exceeds the preset resolution, the video frame insertion algorithm in the prior art cannot insert a frame into the first video. To resolve the foregoing problem, an embodiment of this application provides a video frame insertion method. When it is determined that resolution of a first video is greater than preset resolution, each video frame of the first video may be processed according to a target rule to obtain a second video whose resolution is less than or equal to the preset resolution; frame insertion processing is performed on the second video by using the video frame insertion algorithm provided in the prior art, to obtain a third video; and a fourth video whose resolution is equal to the resolution of the first video and in which a quantity of frames is the same as a quantity of frames in the third video is generated according to the target rule and the third video. In this solution, for an original high-resolution video, resolution of the original video is reduced according to the target rule, so that frame insertion processing for the video can be implemented; and then, a frame-inserted low-resolution video can be restored into a frame-inserted high-resolution video according to the target rule again, so that frame insertion processing for a high-resolution video is implemented.

A video frame insertion method and apparatus and an electronic device provided in the embodiments of this application are described in detail below with reference to the accompanying drawing and by using specific embodiments and application scenarios thereof.

As shown in FIG. 1, an embodiment of this application provides a video frame insertion method. The method may include the following S101 to S103. The method is described below by using an example in which the electronic device is used as an execution entity.

S101: In a case that resolution of a first video is greater than preset resolution, the electronic device processes each video frame of the first video according to a target rule to obtain a second video, where resolution of the second video is less than or equal to the preset resolution.

It should be noted that the preset resolution may be maximum resolution supported by a video frame insertion algorithm provided by a chip platform merchant or a video platform merchant. It can be understood that maximum resolution supported by video frame insertion algorithms provided by different chip platforms or video platforms may be different, and accordingly, preset resolution may be different. This may be determined based on an actual use requirement, and is not limited in this embodiment of this application.

When a user wants to save a frame-inserted video corresponding to the first video in the electronic device, the user may tap a frame insertion control corresponding to the first video, so that the electronic device may first determine whether the resolution of the first video is greater than the preset resolution, that is, determine whether the resolution of the first video is a high-resolution video exceeding limits of a chip platform merchant or a video platform merchant. If it is determined that the resolution of the first video is greater than the preset resolution, the video frame insertion method provided in this embodiment of this application may be used to insert a frame into the first video, that is, S101 to S103 are performed. If it is determined that the resolution of the first video is less than or equal to the preset resolution, a frame may be inserted into the first video by using a video frame insertion algorithm in the prior art, and details are not described herein.

Optionally, the first video may be any one of the following: a video downloaded from a server, a video shared by another device to the electronic device, a video locally stored on the electronic device, a video captured by the electronic device, or any other possible video. This is not limited in this embodiment of this application.

Optionally, the preset resolution may include a preset horizontal pixel and a preset vertical pixel. Generally, horizontal pixels of video frames of the first video are equal, and vertical pixels of the video frames of the first video are equal. Therefore, that "the resolution of the first video is greater than the preset resolution" may include at least one of the following:

a horizontal pixel of each video frame of the first video is greater than the preset horizontal pixel; and a vertical pixel of each video frame of the first video is greater than the preset vertical pixel.

Specifically, that the resolution of the first video is greater than the preset resolution is divided into the following three cases:

Case 1: The horizontal pixel of each video frame of the first video is greater than the preset horizontal pixel, and the vertical pixel of each video frame of the first video is less than the preset vertical pixel.

Case 2: The horizontal pixel of each video frame of the first video is less than the preset horizontal pixel, and the vertical pixel of each video frame of the first video is greater than the preset vertical pixel.

Case 3: The horizontal pixel of each video frame of the first video is greater than the preset horizontal pixel, and the vertical pixel of each video frame of the first video is greater than the preset vertical pixel.

For example, it is assumed that the preset horizontal pixel is 540p, and the preset vertical pixel is 720p.

Figure 2:
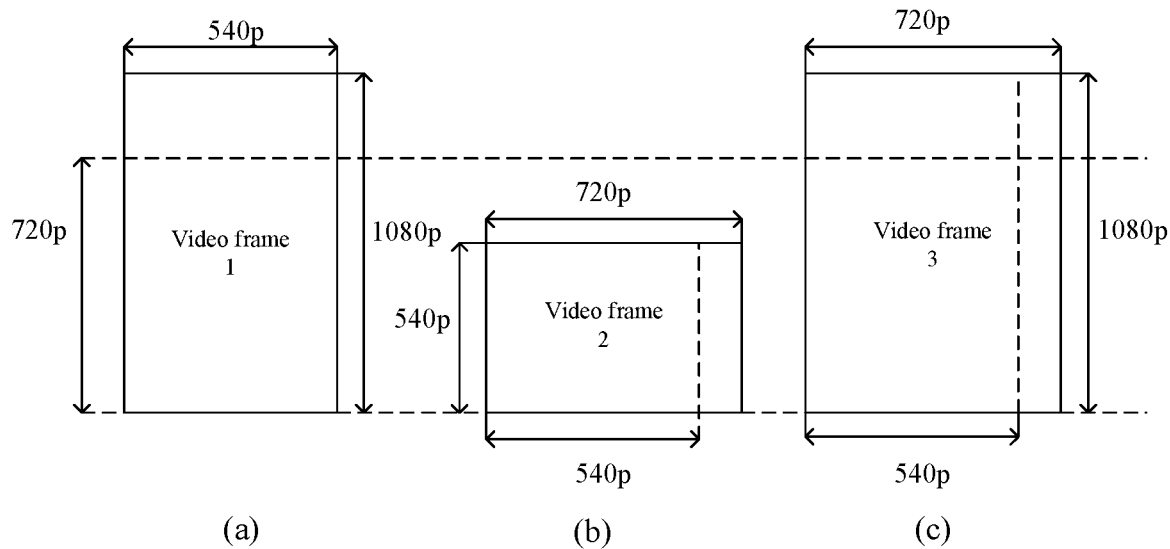
FIG. 2 is a schematic diagram of several video frames according to an embodiment of this application.

As shown in (a) in FIG. 2, a horizontal pixel of a video frame 1 is 540p, and a vertical pixel of the video frame 1 is 1080p. Because the horizontal pixel of the video frame 1 is equal to the preset horizontal pixel, and the vertical pixel of the video frame 1 is greater than the preset vertical pixel, it can be determined that the resolution of the video frame 1 is greater than the preset resolution.

As shown in (b) in FIG. 2, a horizontal pixel of a video frame 2 is 720p, and a vertical pixel of the video frame 2 is 540p. Because the horizontal pixel of the video frame 2 is greater than the preset horizontal pixel, and the vertical pixel of the video frame 2 is less than the preset vertical pixel, it can be determined that the resolution of the video frame 2 is greater than the preset resolution.

As shown in (c) in FIG. 2, a horizontal pixel of a video frame 3 is 720p, and a vertical pixel of the video frame 3 is 1080p. Because the horizontal pixel of the video frame 3 is greater than the preset horizontal pixel, and the vertical pixel of the video frame 3 is greater than the preset vertical pixel, it can be determined that the resolution of the video frame 3 is greater than the preset resolution.

It should be noted that in this embodiment of this application, the preset horizontal pixel and the preset vertical pixel may be equal; the preset horizontal pixel is greater than the preset vertical pixel; or the preset horizontal pixel is less than the preset vertical pixel. This may be determined based on an actual use requirement, and is not limited in this embodiment of this application.

Optionally, the target rule may include at least one of the following:
a. A video frame segmenting rule, which is a segmenting rule for segmenting one video frame into multiple subframes; and
b. A video frame redundant block compression rule, which is a rule for compressing a redundant block in a video frame.

For these two rules, reference may be made to detailed descriptions in the following examples, and details are not described herein.

It can be understood that, when each video frame of the first video is processed according to the target rule, resolution of each video frame can be reduced, to obtain the second video whose resolution is less than or equal to the preset resolution. Therefore, the resolution of the second video is less than the resolution of the first video.

S102: The electronic device performs frame insertion processing on the second video to obtain a third video.

The resolution of the second video is less than or equal to the preset resolution, that is, the resolution of the second video is less than maximum resolution supported by a video frame insertion algorithm provided by the chip platform merchant or the video platform merchant. Therefore, frame insertion processing may be performed on the second video by using the video frame insertion algorithm provided in the prior art, to obtain the third video.

It should be noted that the resolution of the third video is equal to the resolution of the second video. A quantity of frames in the third video is equal to a quantity of frames in the second video and a quantity of inserted video frames. In a process of performing frame insertion processing on the second video, one or more video frames may be inserted between two adjacent video frames, and a quantity may be determined according to an actual use requirement. This is not limited in this embodiment of this application.

S103: The electronic device generates a fourth video according to the target rule and the third video, where resolution of the fourth video is equal to the resolution of the first video, and a quantity of frames in the fourth video is the same as a quantity of frames in the third video.

In a possible implementation, if the target rule is the video frame segmenting rule, the second video is switched to multiple second sub-videos; multiple third sub-videos are obtained after frame insertion processing is performed on the multiple second sub-videos; then, the multiple third sub-videos may be spliced frame by frame according to the video frame segmenting rule, so that the third video may be restored to the high-resolution fourth video.

In another possible implementation, if the target rule is the video frame redundant block compression rule, each video frame of the first video is compressed to obtain a low-resolution second video; after frame insertion processing is performed on the second video and the third video is obtained, frame insertion processing may be performed on redundant blocks in adjacent video frames in the high-resolution first video in a frame insertion processing manner for the second video, to obtain the high-resolution fourth video.

For the two possible implementations, reference may be made to detailed descriptions in the following embodiments, and details are not described herein.

An embodiment of this application provides a video frame insertion method. When it is determined that resolution of a first video is greater than preset resolution, each video frame of the first video may be processed according to a target rule to obtain a second video whose resolution is less than or equal to the preset resolution; frame insertion processing is performed on the second video to obtain a third video; and a fourth video whose resolution is equal to the resolution of the first video and in which a quantity of frames is the same as a quantity of frames in the third video is generated according to the target rule and the third video. In this solution, for an original high-resolution video, the resolution of the original video is reduced according to the target rule, so that frame insertion processing for the video can be implemented; and then, a frame-inserted low-resolution video can be restored into a frame-inserted high-resolution video according to the target rule again, so that frame insertion processing for a high-resolution video is implemented.

To more clearly illustrate the embodiments of this application, the video frame insertion method provided in this application is described by using the following embodiment 1 and embodiment 2 as examples.

Embodiment 1

In a case that the target rule is the video frame segmenting rule, the second video may include M second sub-videos, that is, the second video may be segmented into M sub-videos. Accordingly, the third video may include M third sub-videos. M is an integer greater than or equal to 2.

Figure 3:
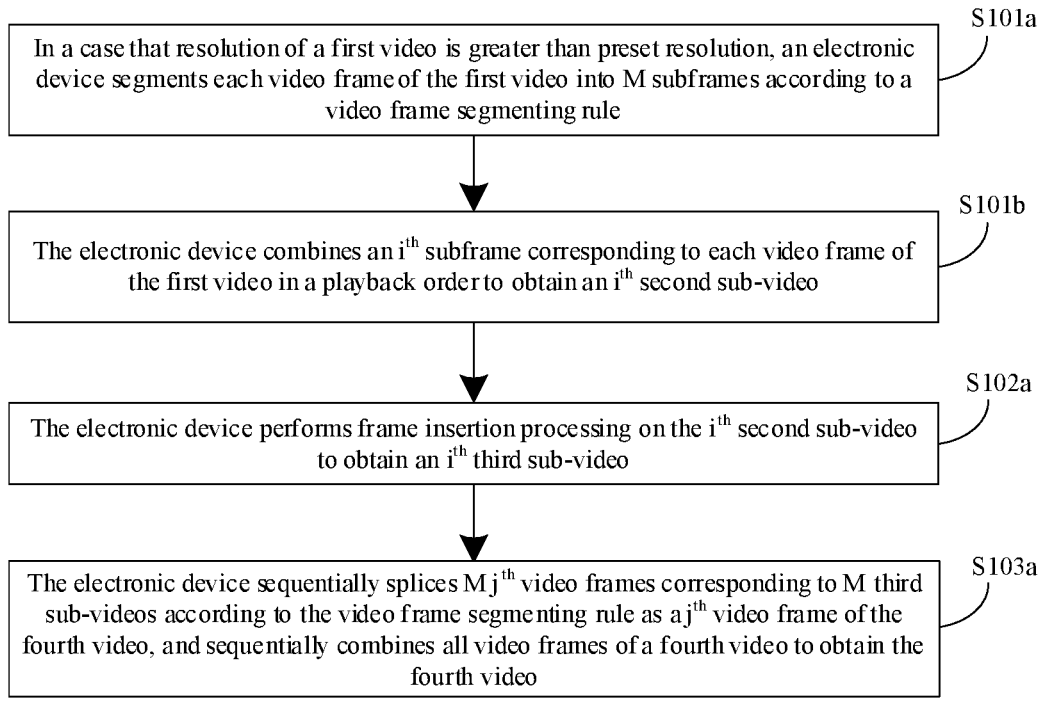
FIG. 3 is a second schematic diagram of a video frame insertion method according to an embodiment of this application.

With reference to FIG. 1, as shown in FIG. 3, S101 may be implemented by the following S101a and S101b, S102 may be implemented by the following S102a, and S103 may be implemented by the following S103a.

S101a: In a case that the resolution of the first video is greater than the preset resolution, the electronic device segments each video frame of the first video into M subframes according to the video frame segmenting rule.

In this embodiment of this application, a horizontal pixel of each of the M subframes is less than or equal to the preset horizontal pixel, and a vertical pixel of each of the M subframes is less than or equal to the preset vertical pixel.

For example, it is assumed that the preset horizontal pixel is 540p, and the preset vertical pixel is 720p.

Figure 4:
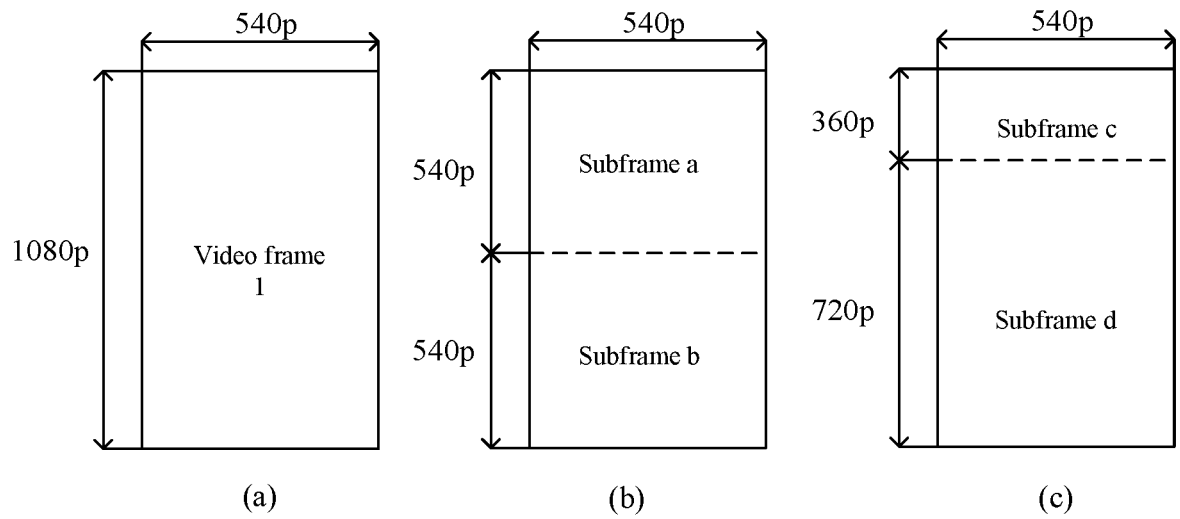
FIG. 4 is a schematic diagram of segmenting processing on a video frame according to an embodiment of this application.

As shown in (a) in FIG. 4, a horizontal pixel of a video frame 1 is 540p, and a vertical pixel of the video frame 1 is 1080p. Because the horizontal pixel of the video frame 1 is equal to the preset horizontal pixel, and the vertical pixel of the video frame 1 is greater than the preset vertical pixel, the video frame 1 needs to be horizontally segmented.

(b) in FIG. 4 provides a video frame segmenting manner. As shown in (b) in FIG. 4, the video frame 1 is horizontally segmented into two subframes of a same size by using a center point of vertical pixels as a segmentation point, horizontal pixels of both a subframe a and a subframe b are 540p, and vertical pixels of both the subframe a and the subframe b are 540p.

(c) in FIG. 4 provides another video frame segmenting manner. As shown in (c) in FIG. 4, the video frame 1 is horizontally segmented into a subframe c and a subframe d by using the preset vertical pixel as a segmentation point. A horizontal pixel of the subframe c is 540p, and a vertical pixel of the subframe c is 360p. A horizontal pixel of the subframe d is 540p, and a vertical pixel of the subframe d is 720p.

S101$b$: The electronic device combines an $i^{th}$ subframe corresponding to each video frame of the first video in a playback order to obtain an $i^{th}$ second sub-video.

A value of i is successively 1 to M.

S102$a$: The electronic device performs frame insertion processing on the $i^{th}$ second sub-video to obtain an $i^{th}$ third sub-video.

S103$a$: The electronic device sequentially splices M $j^{th}$ video frames corresponding to M third sub-videos according to the video frame segmenting rule as a $j^{th}$ video frame of the fourth video, and sequentially combines all video frames of the fourth video to obtain the fourth video.

j is equal to a sum of the quantity of frames in the first video and a quantity of inserted intermediate video frames.

That the preset horizontal pixel is 540p and the preset vertical pixel is 720p is used as an example below for description.

Figure 5:
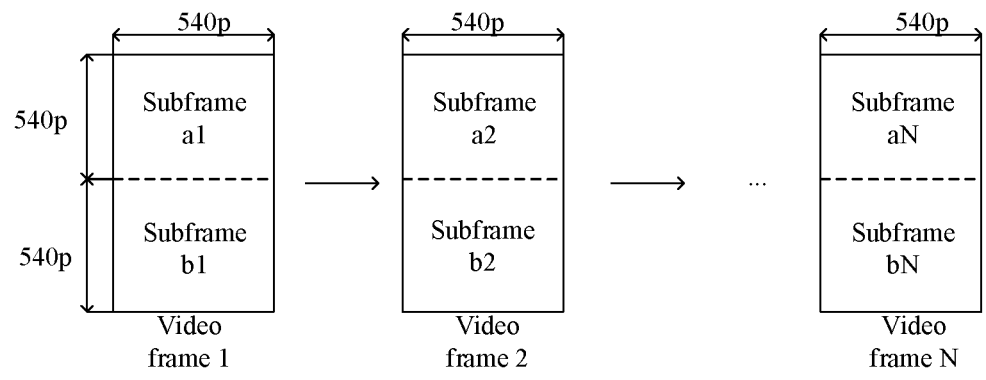
FIG. 5 is a first schematic diagram of inserting a frame into a high-resolution video according to an embodiment of this application.
Figure 5:
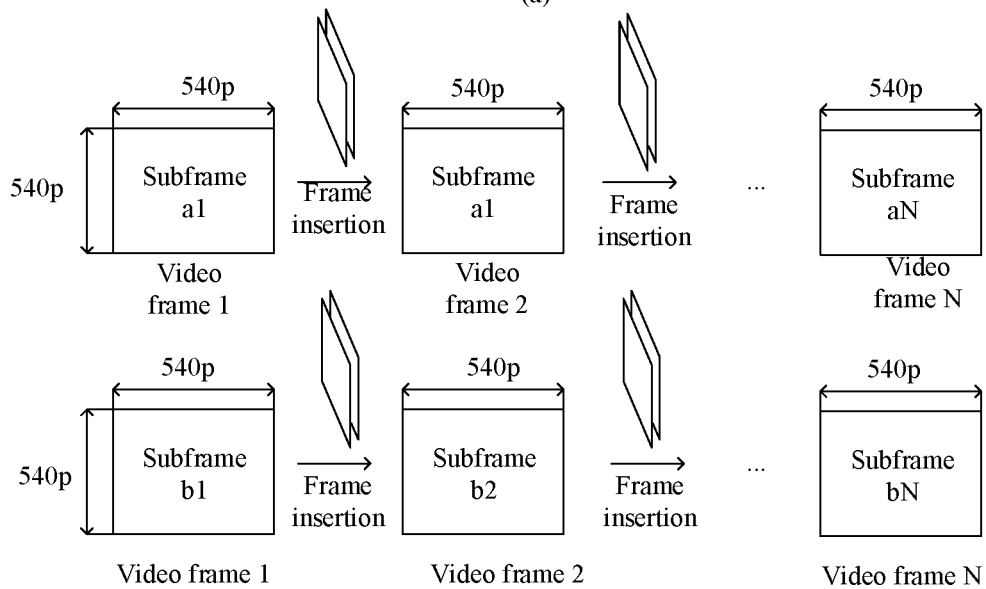
Figure 5:
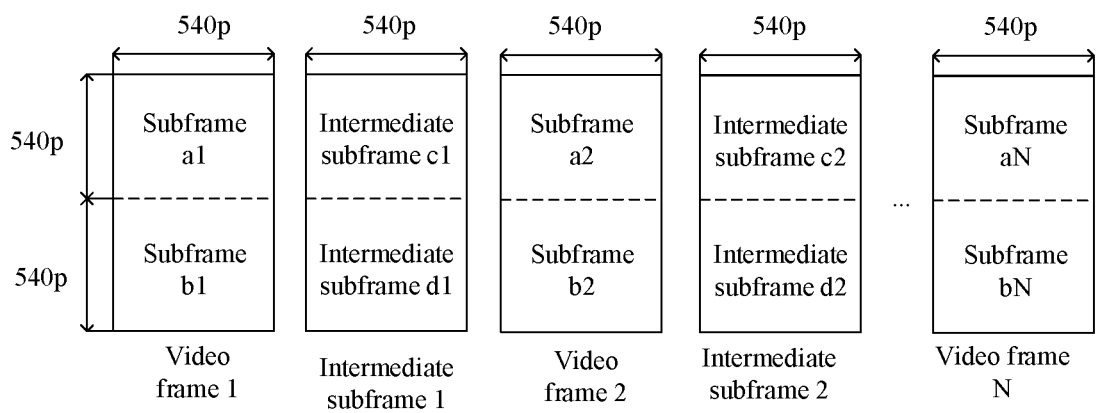

As shown in (a) in FIG. 5, the first video includes video frames 1 to N. Each of the N video frames is horizontally segmented into two subframes of a same size, a horizontal pixel of each subframe is 540p, and a vertical pixel of each subframe is 540p.

As shown in (b) in FIG. 5, the electronic device may combine subframes a1 to aN into a first sub-video in a playback order of the video, and combine subframes b1 to bN into a second sub-video, that is, the first video is segmented into two sub-videos with a same quantity of frames and same playback duration. Then, for each sub-video, the electronic device may insert at least one intermediate frame between every two adjacent subframes to obtain one third sub-video.

As shown in (c) in FIG. 5, according to the video frame segmenting rule, the electronic device may splice a subframe a1 of the first sub-video and a subframe b1 of the second sub-video into a video frame 1, splice an intermediate subframe c1 of the first sub-video and a subframe d1 of the second sub-video into an intermediate video frame 1, splice a subframe a2 of the first sub-video and a subframe b2 of the second sub-video into a video frame 2, and splice an intermediate subframe c2 of the first sub-video and a subframe d2 of the second sub-video into an intermediate video frame 2, . . . until a subframe aN of the first sub-video and a subframe bN of the second sub-video are spliced into a video frame N. Then, the electronic device combines the video frame 1, the intermediate video frame 1, the video frame 2, the intermediate video frame 2, . . . , and the video frame N, to obtain a fourth video whose resolution is the same as the resolution of the first video and in which a quantity of frames is the same as a quantity of frames of each third sub-video.

According to the video frame insertion method provided in this embodiment of this application, according to the idea of "video segmentation preprocessing—frame insertion algorithm—video splicing post-processing", a high-resolution video may be first segmented into low-resolution videos, and then, the low-resolution videos are stored in a frame insertion algorithm, and finally, multiple videos stored through frame insertion are spliced into one high-resolution video, to avoid limits of an existing video frame insertion algorithm on resolution of a video, so that a problem that a frame cannot be inserted into the high-resolution video for storage is resolved.

Optionally, if the video frame is directly segmented into multiple subframes and then the subframes are spliced, a picture at a segmentation location may become very shape. Therefore, one more low-resolution video crossing a segmentation line may be obtained through segmentation, and then, during post-processing splicing, smoothing processing may be performed by using a video that is segmented for multiple times.

It is assumed that the M subframes corresponding to each video frame of the first video may include N first subframes and M−N second subframes, that is, each video frame of the first video is segmented into N first subframes and M−N second subframes. A spliced image of the N first subframes is one video frame of the first video, and there is an image overlap area between one second subframe and each of two adjacent first subframes. In this case, S101$a$ may be implemented by the following S101$a$1, and S103 may be implemented by the following S103$a$1 and S103$a$2.

S101$a$1: In a case that the resolution of the first video is greater than the preset resolution, the electronic device segments each video frame of the first video into N first subframes and M-N second subframes according to the video frame segmenting rule.

For a specific implementation in which each video frame of the first video is segmented into N first subframes and M−N second subframes, reference may be made to related descriptions of segmenting subframes in the embodiment, and details are not described herein again.

In this embodiment of this application, M−N is less than N.

Optionally, M−N=N−1, that is, a quantity of second subframes is one less than a quantity of first subframes.

That the first video includes a video frame 1 and a video frames 2, N=2, and M−N=1 is used as an example below for description. For example, as shown in (a) in FIG. 6, the electronic device may segment the video frame 1 into a subframe a1, a subframe b1, and a subframe c1, and segment the video frame 2 into a subframe a2, ta subframe b2, and a subframe c3 according to a preset video frame segmenting rule. A spliced image of the subframe a1 and the subframe b1 is the video frame 1, a spliced image of the subframe a2 and the subframe b2 is the video frame 2, the subframe c1 crosses a segmentation line of the subframe a1 and the subframe b1, and there are overlapping images with the subframe a1 and the subframe b1 respectively, and the subframe c2 crosses ta segmentation line of the subframe a2 and the subframe b2, and there are overlapping images with the subframe a2 and the subframe b2 respectively.

S101$b$: The electronic device combines an $i^{th}$ subframe corresponding to each video frame of the first video in a playback order to obtain an $i^{th}$ second sub-video.

S102$a$: The electronic device performs frame insertion processing on the $i^{th}$ second sub-video to obtain an $i^{th}$ third sub-video.

Figure 6:
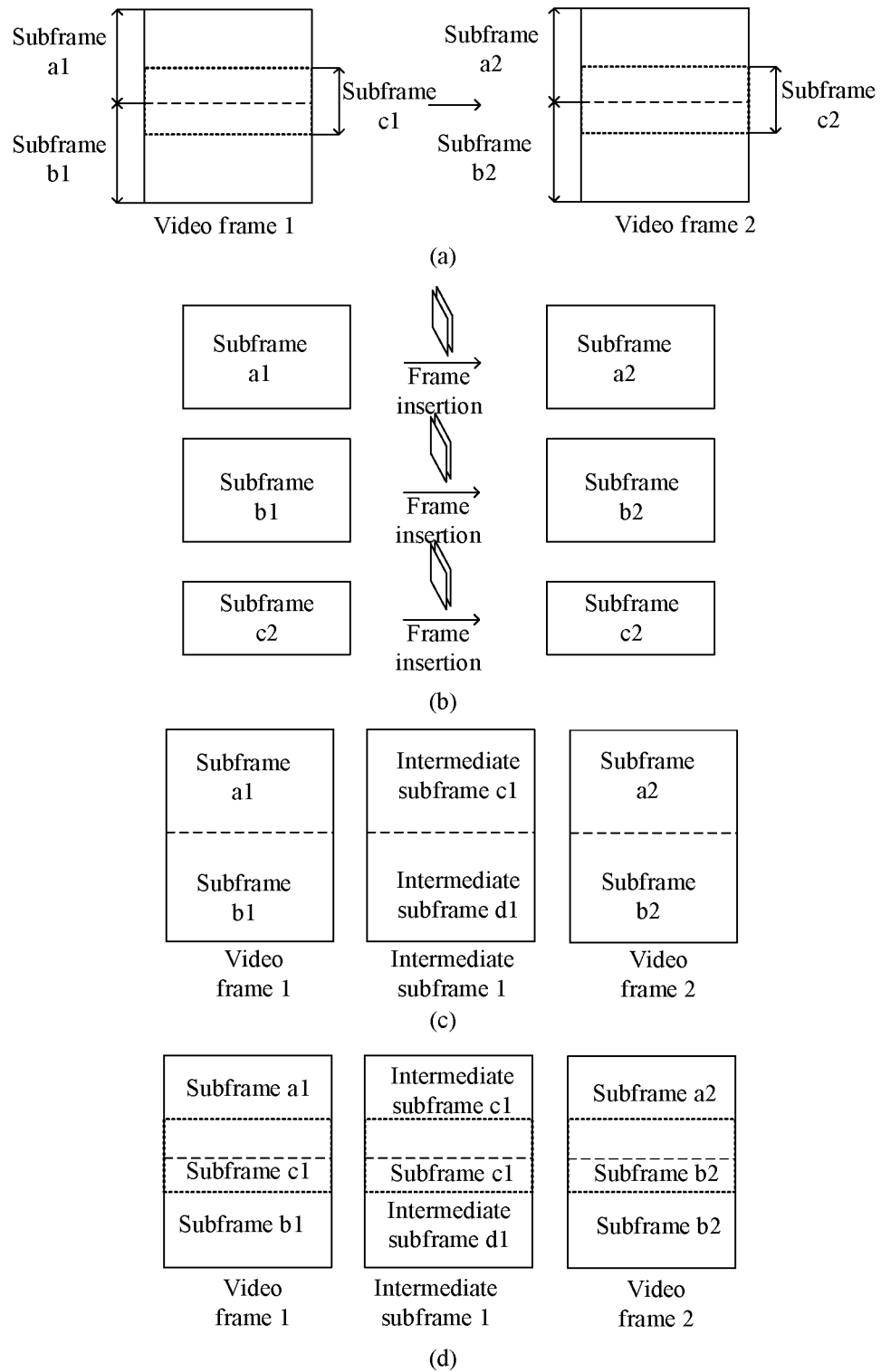
FIG. 6 is a second schematic diagram of inserting a frame into a high-resolution video according to an embodiment of this application.

In a solution shown in (a) in FIG. 6, after segmenting each video frame of the first video into two first subframes and one second subframe, the electronic device may combine the subframe a1 and the subframe a2 into a first second sub-video, combine the subframe b1 and the subframe b2 into a second second sub-video, and combine the subframe c1 and the subframe c2 into a third second sub-video; and then, as shown in (b) in FIG. 6, the electronic device may insert an intermediate frame between the subframe a1 and the subframe a2, insert an intermediate frame between the subframe b1 and the subframe b2, and insert an intermediate frame between the subframe c1 and the subframe c2.

S103a1: The electronic device sequentially splices N $j^{th}$ video frames corresponding to N third sub-videos according to the video frame segmenting rule to obtain a $j^{th}$ initial spliced frame, where the N third sub-videos are video frames obtained after frame insertion processing is performed on the N first sub-videos.

In a solution shown in (b) in FIG. 6, after frame insertion processing is performed on three second sub-videos, as shown in (c) in FIG. 6, a first second sub-video and a second second sub-video are spliced, for example, the subframe a1 and the subframe b1 are spliced to obtain a first initial spliced frame, the subframe c1 and the subframe d1 are spliced to obtain a second initial spliced frame, and the subframe a2 and the subframe b2 are spliced to obtain a third initial spliced frame.

S103a2: The electronic device performs smoothing processing on an image overlapping area in the $j^{th}$ initial spliced frame by using M−N $j^{th}$ video frames corresponding to the M−N third sub-videos to obtain a $j^{th}$ video frame of the fourth video, and sequentially combines all video frames of the fourth video to obtain the fourth video. The M−N third sub-video is a video obtained after frame insertion processing of the M−N second subframes.

In a solution shown in (c) in FIG. 6, after the three initial spliced frames are obtained, as shown in (d) in FIG. 6, the electronic device may perform smoothing processing on an image overlapping area in the first initial spliced frame by using the subframe c1 to obtain a first video frame of the fourth video, perform smoothing processing on an image overlapping area in the second initial spliced frame by using a subframe e1 to obtain a second video frame of the fourth video, and perform smoothing processing on an image overlapping area in the third initial spliced frame by using the subframe c2 to obtain a second video frame of the fourth video. Then, the electronic device may combine the first video frame, the second video frame, and the third video frame to obtain the fourth video. In this way, the resolution of the finally obtained fourth video is the same as the resolution of the initial first video. Therefore, in this embodiment of this application, frame insertion processing is implemented on the high-resolution first video, and smoothing processing is performed by using a video that is segmented for multiple times, so that the finally obtained fourth video is more smooth.

Embodiment 2

Because many areas on each video frame of the first video have very similar content within a specific range, this small part of picture may be represented by an even smaller piece of content or even a pixel on the picture. Therefore, an embodiment of this application provides a video frame insertion method based on a video frame redundant block compression rule.

Figure 7:
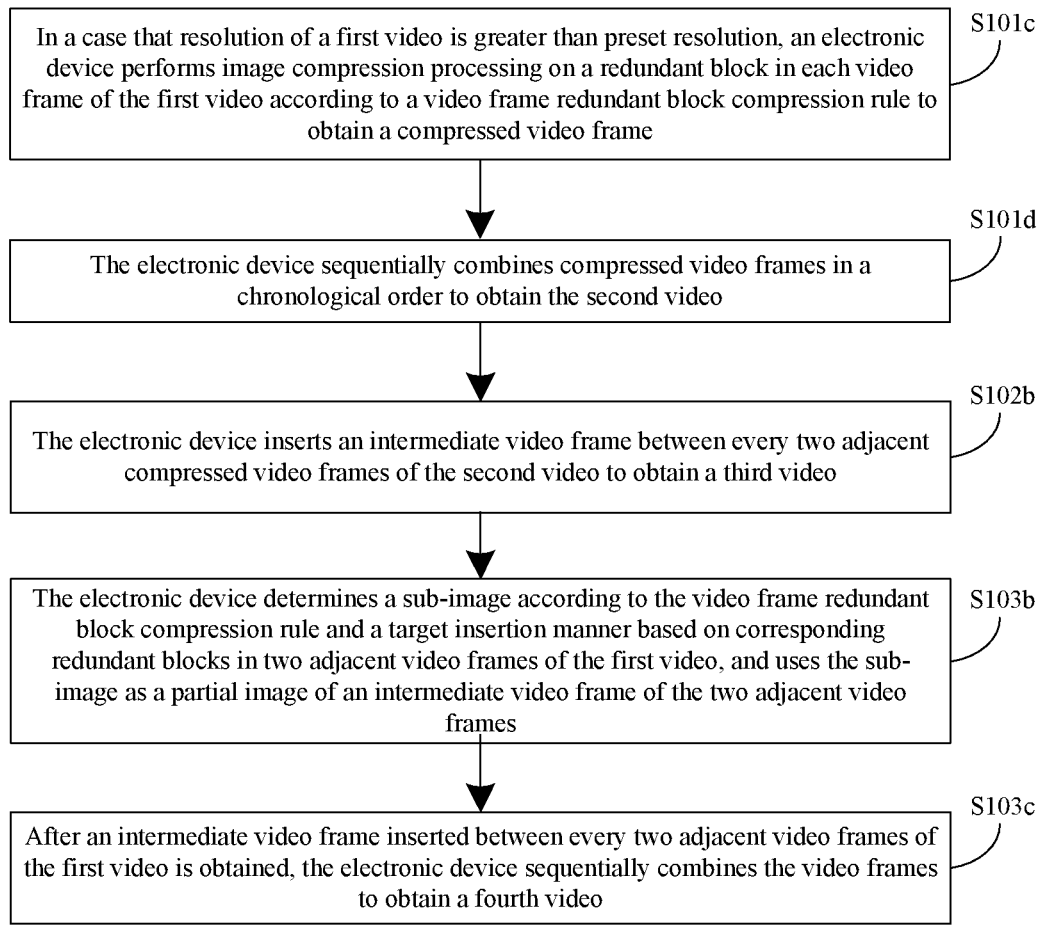
FIG. 7 is a third schematic diagram of a video frame insertion method according to an embodiment of this application.

With reference to FIG. 1, as shown in FIG. 7, in a case that the target rule is the video frame redundant block compression rule, S101 may be implemented by the following S101c and S101d, S102 may be implemented by the following S102b, and S103 may be implemented by the following S103b and S103c.

S101c: In a case that the resolution of the first video is greater than the preset resolution, the electronic device performs image compression processing on a redundant block in each video frame of the first video according to the video frame redundant block compression rule to obtain a compressed video frame.

A horizontal pixel of the compressed video frame is less than or equal to the preset horizontal pixel. A vertical pixel of the compressed video frame is less than or equal to the preset vertical pixel.

It should be noted that the redundant block is an area image in which a video frame includes similar or identical content. In a redundant block of a video frame, a difference between pixels is less than or equal to a preset value.

Optionally, the video frame redundant block compression rule includes at least one of the following: a quantity relationship between an uncompressed redundant block and a compressed redundant block, a block relationship between an uncompressed redundant block and a compressed redundant block, a relative location relationship between an uncompressed redundant block and a compressed redundant block, a pixel value of a pixel of an uncompressed redundant block, a pixel value of a pixel of a compressed redundant block, and the like.

For example, the electronic device may analyze redundant blocks in the video frames of the first video frame by frame, to determine a small block close to each video frame. For example, one original video frame includes redundant blocks a1 to a12 shown in (a) in FIG. 8. The electronic device may extract an area b1 from the redundant block a1, extract an area b2 from a redundant block a2, . . . , and extract an area b12 from the redundant a12. Then, as shown in (b) in FIG. 8, the area b1, the area b2, . . . , and the area b12 are combined into a compressed video frame, and resolution of the compressed video frame is less than or equal to resolution of an original video frame.

S101d: The electronic device sequentially combines compressed video frames in a chronological order to obtain the second video.

After obtaining a compressed video frame corresponding to the first video frame of the first video, the electronic device may sequentially obtain a compressed video frame corresponding to a second video frame of the first video, . . . , and a compressed video frame corresponding to a last video frame of the first video in a playback order of video frames of the first video. These compressed video frames are sequentially combined in a playback order of the video frames to obtain the second video.

S102b: The electronic device inserts an intermediate video frame between every two adjacent compressed video frames of the second video to obtain the third video.

Resolution of the compressed video frame is less than or equal to the preset resolution, that is, is less than maximum resolution supported by a video frame insertion algorithm provided by the chip platform merchant or the video platform merchant. Therefore, frame insertion processing may be performed on the second video by using the video frame insertion algorithm provided in the prior art, to obtain the third video.

Figure 8:
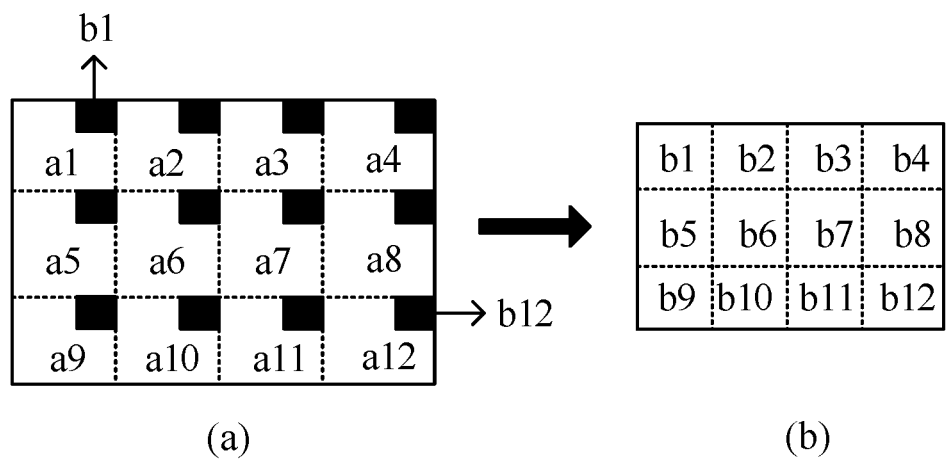
FIG. 8 is a schematic diagram of compression processing on a video frame according to an embodiment of this application.
Figure 9:
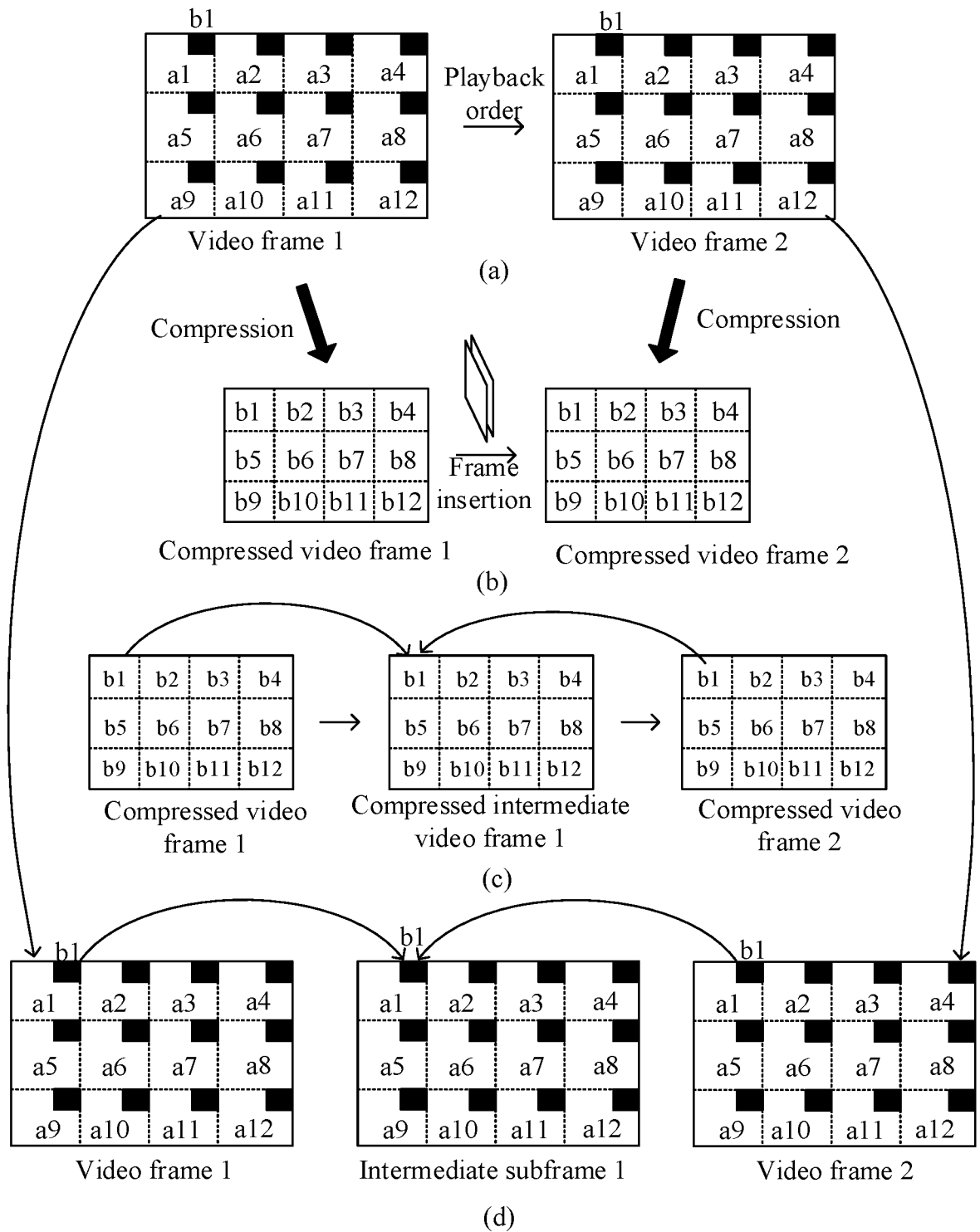
FIG. 9 is a third schematic diagram of inserting a frame into a high-resolution video according to an embodiment of this application.

For example, the first video includes a video frame 1 and a video frame 2 as shown in (a) in FIG. 9. As shown in (b)

in FIG. 9, the electronic device may separately obtain a compressed video frame 1 corresponding to the video frame 1 and a compressed video frame 2 corresponding to the video frame 2 according to the video frame compression rule provided in FIG. 8.

When frame insertion processing is performed on the compressed video frame 1 and the compressed video frame 2, a $t^{th}$ sub-image of a compressed intermediate video frame 1 is determined based on a $t^{th}$ compressed redundant block of the compressed video frame 1 and a $t^{th}$ redundant block of the compressed video frame 2. For example, as shown in (c) in FIG. 9, a sub-image b1 of the compressed intermediate video frame 1 may be determined based on a first sub-image b1 of the compressed video frame 1 and a second sub-image b1 of the compressed video frame 2, and the determined sub-image b1, sub-image b2, . . . , and sub-image b12 are spliced into the compressed intermediate video frame 1. Then, the compressed video frame 1, the compressed intermediate video frame 1, and the compressed video frame 2 are combined into the third video.

S103b: The electronic device determines a sub-image according to the video frame redundant block compression rule and a target insertion manner based on corresponding redundant blocks in two adjacent video frames of the first video, and uses the sub-image as a partial image of an intermediate video frame of the two adjacent video frames.

The target insertion manner is a manner of inserting the partial image of the intermediate video frame between a first sub-image of a first compressed video frame and a second sub-image of a second compressed video frame. The first sub-image and the second sub-image are images obtained after corresponding redundant blocks in two adjacent video frames are compressed.

S103c: After an intermediate video frame inserted between every two adjacent video frames of the first video is obtained, the electronic device sequentially combines the video frames to obtain the fourth video.

As shown in (d) in FIG. 9, the electronic device may determine an insertion manner of the sub-image b1 of the compressed intermediate video frame 1 based on a compressed redundant block M of the compressed video frame 1 and a compressed redundant block b1 of the compressed video frame 2, and use the determined sub-image a1 as one sub-image of the intermediate video frame 1 based on a redundant block a1 of the video frame 1 of the first video and a redundant block a1 of the video frame 2 of the first video. The obtained sub-image a1, sub-image a2, . . . , and sub-image a12 are spliced into an intermediate video frame 1, so that the intermediate video frame 1 is inserted between the video frame 1 and the video frame 2 of the first video.

In this embodiment of the present invention, redundant information preprocessing is performed on a high-resolution video, so that resolution of an original video can be reduced, and a video obtained after preprocessing is sent to a platform frame insertion algorithm, to obtain video content after frame insertion processing; and finally, a software frame insertion algorithm can use the information to perform same processing on a redundant part on the original video, so that an entire frame picture of the original video can pass processing of the platform frame insertion algorithm. In this manner, a result of the platform frame insertion algorithm can be used, so that a better frame insertion effect can be obtained, and further, performance of the software frame insertion algorithm is improved.

It should be noted that, the video frame insertion method provided in this embodiment of this application may be performed by a video frame insertion apparatus, or a control module in the video frame insertion apparatus for performing the video frame insertion method. In the embodiments of this application, an example in which the video frame insertion apparatus performs the video frame insertion method is used to describe the video frame insertion method provided in the embodiments of this application.

Figure 10:
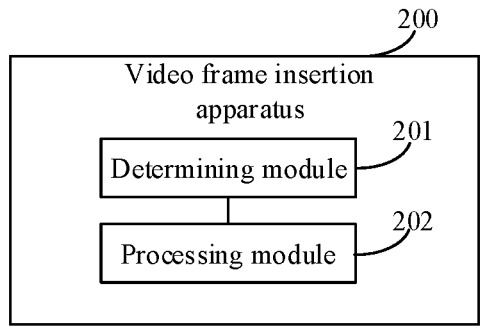
FIG. 10 is a schematic diagram of a structure of a video frame insertion apparatus according to an embodiment of the application.

As shown in FIG. 10, an embodiment of this application provides a video frame insertion apparatus 200. The video frame insertion apparatus includes a determining module 201 and a processing module 202.

The processing module 202 may be configured to: in a case that the determining module 201 determines that resolution of a first video is greater than preset resolution, process each video frame of the first video according to a target rule to obtain a second video, where resolution of the second video is less than or equal to the preset resolution; perform frame insertion processing on the second video to obtain a third video; and generate a fourth video according to the target rule and the third video. Resolution of the fourth video is equal to the resolution of the first video, and a quantity of frames in the fourth video is the same as a quantity of frames in the third video.

Optionally, the preset resolution includes a preset horizontal pixel and a preset vertical pixel. That the resolution of the first video is greater than the preset resolution includes at least one of the following:

a horizontal pixel of each video frame of the first video is greater than the preset horizontal pixel; and a vertical pixel of each video frame of the first video is greater than the preset vertical pixel.

Optionally, the target rule is a video frame segmenting rule, the second video includes M second sub-videos, the third video includes M third sub-videos, and M is an integer greater than or equal to 2. The processing module 202 may be specifically configured to:

segment each video frame of the first video into M subframes according to the video frame segmenting rule, and combine an $i^{th}$ subframe corresponding to each video frame of the first video in a playback order to obtain an $i^{th}$ second sub-video, where a value of i is successively 1 to M;

perform frame insertion processing on the $i^{th}$ second sub-video to obtain an $i^{th}$ third sub-video; and sequentially splice M $j^{th}$ video frames corresponding to the M third sub-videos according to the video frame segmenting rule as a $j^{th}$ video frame of the fourth video, and sequentially combine all video frames of the fourth video to obtain the fourth video, where j is a positive integer; where a horizontal pixel of each of the M subframes is less than or equal to the preset horizontal pixel, and a vertical pixel of each of the M subframes is less than or equal to the preset vertical pixel.

Optionally, the M subframes corresponding to each video frame of the first video include N first subframes and M−N second subframes, a spliced image of the N first subframes is a video frame of the first video, and there is an image overlapping area between one second subframe and each of two adjacent first subframes. The processing module 202 may be specifically configured to:

sequentially splice N $j^{th}$ video frames corresponding to N third sub-videos according to the video frame segmenting rule, to obtain a $j^{th}$ initial spliced frame; and smooth an image overlapping area in the $j^{th}$ initial spliced frame by using M−N $j^{th}$ video frames corresponding to M−N third sub-videos to obtain the $j^{th}$ video frame of the fourth video; where the N third sub-videos are video frames obtained after frame insertion processing is performed on the N first subframes, and the M−N third sub-videos are videos obtained after frame insertion processing is performed on the M−N second subframes.

Optionally, the target rule is a video frame redundant block compression rule. The processing module 202 may be specifically configured to:

perform image compression processing on a redundant block in each video frame of the first video according to the video frame redundant block compression rule to obtain a compressed video frame, and sequentially combine the compressed video frames in a chronological order to obtain the second video, where a difference between a pixel value of each pixel in the redundant block is less than or equal to a preset value, a horizontal pixel of the compressed video frame is less than or equal to the preset horizontal pixel, and a vertical pixel of the compressed video frame is less than or equal to the preset vertical pixel;

insert an intermediate video frame between every two adjacent compressed video frames of the second video to obtain the third video; and determine a sub-image according to the video frame redundant block compression rule and a target insertion manner based on corresponding redundant blocks in two adjacent video frames of the first video, and use the sub-image as a partial image of an intermediate video frame of the two adjacent video frames; and after an intermediate video frame inserted between every two adjacent video frames of the first video is obtained, sequentially combine the video frames to obtain the fourth video; where the target insertion manner is a manner of inserting the partial image of the intermediate video frame between a first sub-image of a first compressed video frame and a second sub-image of a second compressed video frame, and the first sub-image and the second sub-image are images obtained after corresponding redundant blocks in the two adjacent video frames are compressed.

An embodiment of this application provides a video frame insertion apparatus. For an original high-resolution video, the resolution of the original video is reduced according to the target rule, so that frame insertion processing for the video can be implemented; and then, a frame-inserted low-resolution video can be restored into a frame-inserted high-resolution video according to the target rule again, so that frame insertion processing for a high-resolution video is implemented.

The video frame insertion apparatus in this embodiment of this application may be an apparatus, or may be a component, an integrated circuit, or a chip in a terminal. The apparatus may be a mobile electronic device, or may be a non-mobile electronic device. For example, the mobile electronic device may be a mobile phone, a tablet computer, a laptop computer, a palmtop computer, an in-vehicle electronic device, a wearable device, an ultra-mobile personal computer (UMPC), a netbook, or a personal digital assistant (PDA). The non-mobile electronic device may be a server, a network attached storage (NAS), a personal computer (PC), a television (TV), an automated teller machine, or a self-service machine. This is not specifically limited in the embodiments of this application.

The video frame insertion apparatus in this embodiment of this application may be an apparatus with an operating system. The operating system may be an Android operating system, an iOS operating system, or another possible operating system. This is not specifically limited in this embodiment of this application.

The video frame insertion apparatus provided in this embodiment of this application can implement processes implemented in the method embodiments from FIG. 1 to FIG. 9. To avoid repetition, details are not described herein again.

Figure 11:
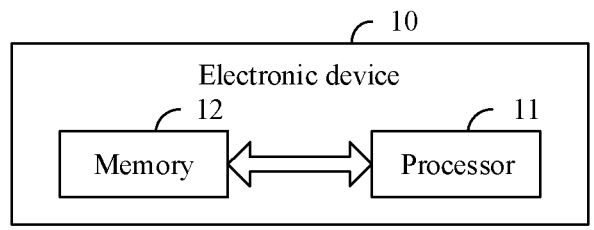
FIG. 11 is a first schematic diagram of hardware of an electronic device according to an embodiment of this application.

Optionally, as shown in FIG. 11, an embodiment of this application further provides an electronic device 10, including a processor 11, a memory 12, and a program or an instruction that is stored in the memory 12 and that can run on the processor 11. When the program or the instruction is executed by the processor 11, the processes of the foregoing video frame insertion method embodiments are implemented, and a same technical effect can be achieved. To avoid repetition, details are not described herein again.

It should be noted that the electronic device in this embodiment of this application includes the foregoing mobile electronic device and the foregoing non-mobile electronic device.

Figure 12:
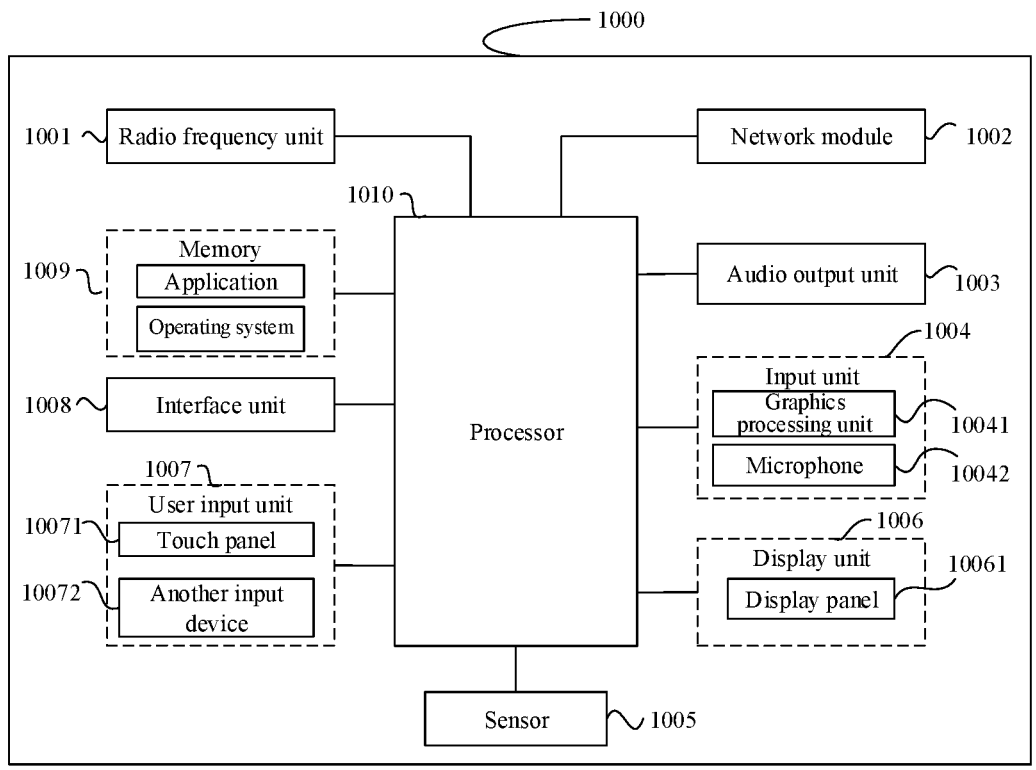
FIG. 12 is a second schematic diagram of hardware of an electronic device according to an embodiment of this application.

FIG. 12 is a schematic diagram of a hardware structure of an electronic device for implementing embodiments of this application.

The electronic device 1000 includes, but is not limited to: a radio frequency unit 1001, a network module 1002, an audio output unit 1003, an input unit 1004, a sensor 1005, a display unit 1006, a user input unit 1007, an interface unit 1008, a memory 1009, and a processor 1010.

It may be understood by a person skilled in the art that the electronic device 1000 may further include a power supply (such as a battery) that supplies power to each component. The power supply may be logically connected to the processor 1010 by using a power management system, to implement functions such as charging, discharging, and power consumption management by using the power management system. A structure of the electronic device shown in FIG. 12 does not constitute a limitation on the electronic device, and may include more or fewer parts than those shown in the figure, or combine some components, or have different part arrangements. Details are not described herein again.

The processor 1010 may be configured to: in a case that it is determined that resolution of a first video is greater than preset resolution, process each video frame of the first video according to a target rule to obtain a second video, where resolution of the second video is less than or equal to the preset resolution; perform frame insertion processing on the second video to obtain a third video; and generate a fourth video according to the target rule and the third video. Resolution of the fourth video is equal to the resolution of the first video, and a quantity of frames in the fourth video is the same as a quantity of frames in the third video.

Optionally, the preset resolution includes a preset horizontal pixel and a preset vertical pixel. That the resolution of the first video is greater than the preset resolution includes at least one of the following: a horizontal pixel of each video frame of the first video is greater than a preset horizontal pixel; and a vertical pixel of each video frame of the first video is greater than a preset vertical pixel.

Optionally, the target rule is a video frame segmenting rule, the second video includes M second sub-videos, the third video includes M third sub-videos, and M is an integer greater than or equal to 2.

The processor 1010 may be specifically configured to:
segment each video frame of the first video into M subframes according to the video frame segmenting rule, and combine an $i^{th}$ subframe corresponding to each video frame of the first video in a playback order to obtain an $i^{th}$ second sub-video, where a value of i is successively 1 to M;

perform frame insertion processing on the $i^{th}$ second sub-video to obtain an $i^{th}$ third sub-video; and sequentially splice M $j^{th}$ video frames corresponding to the M third sub-videos according to the video frame segmenting rule as a $j^{th}$ video frame of the fourth video, and sequentially combine all video frames of the fourth video to obtain the fourth video, where j is a positive integer; where a horizontal pixel of each of the M subframes is less than or equal to the preset horizontal pixel, and a vertical pixel of each of the M subframes is less than or equal to the preset vertical pixel.

Optionally, the M subframes corresponding to each video frame of the first video include N first subframes and M−N second subframes, a spliced image of the N first subframes is a video frame of the first video, and there is an image overlapping area between one second subframe and each of two adjacent first subframes.

The processor 1010 may be specifically configured to:

sequentially splice N $j^{th}$ video frames corresponding to N third sub-videos according to the video frame segmenting rule, to obtain a $j^{th}$ initial spliced frame; and smooth an image overlapping area in the $j^{th}$ initial spliced frame by using M−N $j^{th}$ video frames corresponding to M−N third sub-videos to obtain the $j^{th}$ video frame of the fourth video; where the N third sub-videos are video frames obtained after frame insertion processing is performed on the N first subframes, and the M−N third sub-videos are videos obtained after frame insertion processing is performed on the M−N second subframes.

Optionally, the target rule is a video frame redundant block compression rule. The processor 1010 may be specifically configured to:

perform image compression processing on a redundant block in each video frame of the first video according to the video frame redundant block compression rule to obtain a compressed video frame, and sequentially combine the compressed video frames in a chronological order to obtain the second video, where a difference between a pixel value of each pixel in the redundant block is less than or equal to a preset value, a horizontal pixel of the compressed video frame is less than or equal to the preset horizontal pixel, and a vertical pixel of the compressed video frame is less than or equal to the preset vertical pixel;

insert an intermediate video frame between every two adjacent compressed video frames of the second video to obtain the third video; and determine a sub-image according to the video frame redundant block compression rule and a target insertion manner based on corresponding redundant blocks in two adjacent video frames of the first video, and use the sub-image as a partial image of an intermediate video frame of the two adjacent video frames; and after an intermediate video frame inserted between every two adjacent video frames of the first video is obtained, sequentially combine the video frames to obtain the fourth video; where the target insertion manner is a manner of inserting the partial image of the intermediate video frame between a first sub-image of a first compressed video frame and a second sub-image of a second compressed video frame, and the first sub-image and the second sub-image are images obtained after corresponding redundant blocks in the two adjacent video frames are compressed.

An embodiment of this application provides an electronic device. For an original high-resolution video, the resolution of the original video is reduced according to the target rule, so that frame insertion processing for the video can be implemented; and then, a frame-inserted low-resolution video can be restored into a frame-inserted high-resolution video according to the target rule again, so that frame insertion processing for a high-resolution video is implemented.

It should be understood that, in this embodiment of this application, the input unit 1004 may include a graphics processing unit (GPU) 10041 and a microphone 10042, and the graphics processing unit 10041 processes image data of a still picture or a video obtained by an image capture apparatus (such as a camera) in a video capture mode or an image capture mode. The display unit 1006 may include a display panel 10061, and the display panel 10061 may be configured in a form such as a liquid crystal display or an organic light-emitting diode. The user input unit 1007 includes a touch panel 10071 and another input device 10072. The touch panel 10071 is also referred to as a touchscreen. The touch panel 10071 may include two parts: a touch detection apparatus and a touch controller. The another input device 10072 may include but is not limited to a physical keyboard, a functional button (such as a volume control button or a power on/off button), a trackball, a mouse, and a joystick. Details are not described herein. The memory 1009 may be configured to store a software program and various data, including but not limited to an application program and an operating system. The processor 1010 may be integrated with an application processor and a modem processor. The application processor mainly processes an operating system, a user interface, an application program, and the like. The modem processor mainly processes wireless communication. It can be understood that, alternatively, the modem processor may not be integrated into the processor 1010.

An embodiment of this application further provides a readable storage medium. The readable storage medium stores a program or an instruction, and when the program or the instruction is executed by a processor, the processes of the foregoing video frame insertion method embodiment are implemented and a same technical effect can be achieved. To avoid repetition, details are not described herein again.

The processor is a processor in the electronic device in the foregoing embodiment. The readable storage medium includes a computer-readable storage medium, such as a computer read-only memory (ROM), a random access memory (RAM), a magnetic disk, or an optical disc.

An embodiment of this application further provides a chip. The chip includes a processor and a communication interface, the communication interface is coupled to the processor, and the processor is configured to run a program or an instruction to implement the processes of the foregoing video frame insertion method embodiment, and a same technical effect can be achieved. To avoid repetition, details are not described herein again.

It should be understood that the chip mentioned in this embodiment of this application may also be referred to as a system-level chip, a system chip, a chip system, or a system on a chip.

It should be noted that in this specification, the terms "comprise", "include", and any other variants thereof are intended to cover non-exclusive inclusion, so that a process, a method, an article, or an apparatus that includes a series of elements not only includes these very elements, but also includes other elements not expressly listed, or also includes elements inherent to this process, method, article, or apparatus. An element limited by "includes a . . . " does not, without more constraints, preclude the presence of additional identical elements in the process, method, article, or apparatus that includes the element. In addition, it should be noted that a scope of the method and the apparatus in the implementations of this application is not limited to: performing a function in a sequence shown or discussed, and may further include: performing a function in a basically simultaneous manner or in a reverse sequence based on an involved function. For example, the described method may be performed in a different order, and various steps may be added, omitted, or combined. In addition, features described with reference to some examples may be combined in other examples.

Based on the descriptions of the foregoing implementations, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of this application essentially, or the part contributing to the prior art may be implemented in a form of a software product. The computer software product is stored in a storage medium (for example, a ROM/RAM, a magnetic disk, or a compact disc), and includes a plurality of instructions for instructing a terminal (which may be a mobile phone, a computer, a server, an air conditioner, a network device, or the like) to perform the method described in the embodiments of this application.

The embodiments of this application are described with reference to the accompanying drawings. However, this application is not limited to the foregoing specific implementations. The foregoing specific implementations are merely examples, but are not limiting. Under the enlightenment of this application, a person of ordinary skill in the art may make many forms without departing from the objective and the scope of the claims of this application, and these forms all fall within the protection scope of this application.

The invention claimed is:

1. A video frame insertion method, wherein the method comprises:
in a case that resolution of a first video is greater than preset resolution, processing each video frame of the first video according to a target rule to obtain a second video, wherein resolution of the second video is less than or equal to the preset resolution;
performing frame insertion processing on the second video to obtain a third video; and
generating a fourth video according to the target rule and the third video, wherein resolution of the fourth video is equal to the resolution of the first video, and a quantity of frames in the fourth video is the same as a quantity of frames in the third video,
wherein the preset resolution comprises a preset horizontal pixel and a preset vertical pixel; and
that the resolution of the first video is greater than the preset resolution comprises at least one of the following:
a horizontal pixel of each video frame of the first video is greater than the preset horizontal pixel; and
a vertical pixel of each video frame of the first video is greater than the preset vertical pixel,
wherein the target rule is a video frame segmenting rule, the second video comprises M second sub-videos, the third video comprises M third sub-videos, and M is an integer greater than or equal to 2;
the processing each video frame of the first video according to a target rule to obtain a second video comprises:
segmenting each video frame of the first video into M subframes according to the video frame segmenting rule, and combining an $i^{th}$ subframe corresponding to each video frame of the first video in a playback order to obtain an $i^{th}$ second sub-video, wherein a value of i is successively 1 to M;
the performing frame insertion processing on the second video to obtain a third video comprises:
performing frame insertion processing on the $i^{th}$ second sub-video to obtain an $i^{th}$ third sub-video; and
the generating a fourth video according to the target rule and the third video comprises:
sequentially splicing M $j^{th}$ video frames corresponding to the M third sub-videos according to the video frame segmenting rule as a $j^{th}$ video frame of the fourth video, and sequentially combining all video frames of the fourth video to obtain the fourth video, wherein j is a positive integer; wherein
a horizontal pixel of each of the M subframes is less than or equal to the preset horizontal pixel, and a vertical pixel of each of the M subframes is less than or equal to the preset vertical pixel,
wherein the M subframes corresponding to each video frame of the first video comprise N first subframes and M-N second subframes, a spliced image of the N first subframes is a video frame of the first video, and there is an image overlapping area between one second subframe and each of two adjacent first subframes; and
the sequentially splicing M $j^{th}$ video frames corresponding to the M third sub-videos according to the video frame segmenting rule as a $j^{th}$ video frame of the fourth video comprises:
sequentially splicing N $j^{th}$ video frames corresponding to N third sub-videos according to the video frame segmenting rule, to obtain a $j^{th}$ initial spliced frame; and
smoothing an image overlapping area in the $j^{th}$ initial spliced frame by using M-N $j^{th}$ video frames corresponding to M-N third sub-videos to obtain the $j^{th}$ video frame of the fourth video; wherein
the N third sub-videos are video frames obtained after frame insertion processing is performed on the N first subframes, and the M-N third sub-videos are videos obtained after frame insertion processing is performed on the M-N second subframes, wherein N is an integer greater than or equal to 2, and M is an integer greater than or equal to 3.

2. A non-transitory readable storage medium, wherein the readable storage medium stores a program or an instruction, and the program or the instruction, when executed by a processor, causes the processor to perform steps of the method according to claim 1.

3. A chip, wherein the chip comprises a processor and a communication interface, the communication interface is coupled to the processor, and the processor is configured to run a program or an instruction to implement the video frame insertion method according to claim 1.

4. An electronic device, comprising a processor, a memory, and a program or an instruction that is stored in the memory and that is executable on the processor, wherein the program or the instruction, when executed by the processor, causes the processor to:
in a case that resolution of a first video is greater than preset resolution, process each video frame of the first video according to a target rule to obtain a second video, wherein resolution of the second video is less than or equal to the preset resolution;
perform frame insertion processing on the second video to obtain a third video; and
generate a fourth video according to the target rule and the third video, wherein resolution of the fourth video is equal to the resolution of the first video, and a quantity of frames in the fourth video is the same as a quantity of frames in the third video, wherein the target rule is a video frame redundant block compression rule,
wherein the processer is specifically configured to:
perform image compression processing on a redundant block in each video frame of the first video according to the video frame redundant block compression rule to obtain a compressed video frame, and sequentially combine the compressed video frames in a chronological order to obtain the second video, wherein a difference between a pixel value of each pixel in the redundant block is less than or equal to a preset value, a horizontal pixel of the compressed video frame is less than or equal to the preset horizontal pixel, and a vertical pixel of the compressed video frame is less than or equal to the preset vertical pixel;
insert an intermediate video frame between every two adjacent compressed video frames of the second video to obtain the third video; and
determine a sub-image according to the video frame redundant block compression rule and a target insertion manner based on corresponding redundant blocks in two adjacent video frames of the first video, and use the sub-image as a partial image of an intermediate video frame of the two adjacent video frames; and
after an intermediate video frame inserted between every two adjacent video frames of the first video is obtained, sequentially combine the video frames to obtain the fourth video; wherein
the target insertion manner is a manner of inserting the partial image of the intermediate video frame between a first sub-image of a first compressed video frame and a second sub-image of a second compressed video frame, and the first sub-image and the second sub-image are images obtained after corresponding redundant blocks in the two adjacent video frames are compressed.

5. The electronic device according to claim 4, wherein the preset resolution comprises a preset horizontal pixel and a preset vertical pixel;
that the resolution of the first video is greater than the preset resolution comprises at least one of the following:
a horizontal pixel of each video frame of the first video is greater than the preset horizontal pixel; and
a vertical pixel of each video frame of the first video is greater than the preset vertical pixel.

6. A video frame insertion method, wherein the method comprises:
in a case that resolution of a first video is greater than preset resolution, processing each video frame of the first video according to a target rule to obtain a second video, wherein resolution of the second video is less than or equal to the preset resolution;
performing frame insertion processing on the second video to obtain a third video; and
generating a fourth video according to the target rule and the third video, wherein resolution of the fourth video is equal to the resolution of the first video, and a quantity of frames in the fourth video is the same as a quantity of frames in the third video,
wherein the target rule is a video frame redundant block compression rule;
the processing each video frame of the first video according to a target rule to obtain a second video comprises:
performing image compression processing on a redundant block in each video frame of the first video according to the video frame redundant block compression rule to obtain a compressed video frame, and sequentially combining the compressed video frames in a chronological order to obtain the second video, wherein a difference between a pixel value of each pixel in the redundant block is less than or equal to a preset value, a horizontal pixel of the compressed video frame is less than or equal to the preset horizontal pixel, and a vertical pixel of the compressed video frame is less than or equal to the preset vertical pixel;
the performing frame insertion processing on the second video to obtain a third video comprises:
inserting an intermediate video frame between every two adjacent compressed video frames of the second video to obtain the third video; and
the generating a fourth video according to the target rule and the third video comprises:
determining a sub-image according to the video frame redundant block compression rule and a target insertion manner based on corresponding redundant blocks in two adjacent video frames of the first video, and using the sub-image as a partial image of an intermediate video frame of the two adjacent video frames; and
after an intermediate video frame inserted between every two adjacent video frames of the first video is obtained, sequentially combining the video frames to obtain the fourth video; wherein
the target insertion manner is a manner of inserting the partial image of the intermediate video frame between a first sub-image of a first compressed video frame and a second sub-image of a second compressed video frame, and the first sub-image and the second sub-image are images obtained after corresponding redundant blocks in the two adjacent video frames are compressed.

7. The method according to claim 6, wherein the preset resolution comprises a preset horizontal pixel and a preset vertical pixel; and
that the resolution of the first video is greater than the preset resolution comprises at least one of the following:
a horizontal pixel of each video frame of the first video is greater than the preset horizontal pixel; and
a vertical pixel of each video frame of the first video is greater than the preset vertical pixel.

* * * * *